United States Patent [19]

Sun et al.

[11] Patent Number: 5,064,266
[45] Date of Patent: Nov. 12, 1991

[54] CIRCULAR CHANNEL WAVEGUIDES AND LENSES FORMED FROM RECTANGULAR CHANNEL WAVEGUIDES

[75] Inventors: Cheng-ko J. Sun, Worthington; Shin Sumida, Columbus; Shigeki Sakaguchi, Worthington; Tadashi Miyashita, Upper Arlington, all of Ohio

[73] Assignee: Photonic Integration Research, Inc., Columbus, Ohio

[21] Appl. No.: 548,008

[22] Filed: Jul. 5, 1990

[51] Int. Cl.$^5$ .............................................. G02B 6/10
[52] U.S. Cl. ................................... 385/132; 385/129; 385/35
[58] Field of Search ............... 350/96.10, 96.11, 96.12, 350/96.17

[56] References Cited

U.S. PATENT DOCUMENTS

| | | | |
|---|---|---|---|
| 4,119,362 | 10/1978 | Holzman | 350/96.18 |
| 4,183,615 | 1/1980 | Rush | 350/96.21 |
| 4,186,998 | 2/1980 | Holzman | 350/96.18 |
| 4,304,461 | 12/1981 | Stewart et al. | 350/96.18 |
| 4,421,383 | 12/1983 | Carlsen | 350/96.21 |
| 4,451,115 | 5/1984 | Nicia et al. | 350/96.18 |
| 4,479,698 | 10/1984 | Landis et al. | 350/96.20 |
| 4,733,931 | 3/1988 | Fan | 350/96.18 |
| 4,902,086 | 2/1990 | Henry et al. | 350/96.12 |

OTHER PUBLICATIONS

"High-Silica Multimode Channel Waveguide Structure for Minimizing Fiber-Waveguide-Fiber Coupling Loss", Journal of Lightwave Technology, vol. Lt-4, No. 3, Mar. 1986, by Y. Yamada, et al.
"Microlens Formation on VAD Single-Mode Fibre Ends", vol. 18, No. 2, p. 71, 1982, by M. Kawachi, et al.
"Resistance to Spreading of Liquids by Sharp Edges", Journal of Colloid and Interface Science, vol. 59, No, 3, May 1977, by J. F. Oliver, et al.
"Trends in Laser Packaging", 40th Electronic Components and Technology Conference May 20-23, 1990, pp. 185-192 by David S. Alles.
"Single-Mode Fiber Packaging for Semiconductor Optical Devices", 40th Electronic Components & Technology Conference, May 20-23, 1990, pp. 193-199 by L. A. Reith, et al.
"Microelectronics: Processing and Device Design", John Wiley & Sons, Inc., pp. 44-45, 1980, by Roy A. Colclaser.
"Etch Rates of Doped Oxides in Solutions of Buffered HF", Journal of Electrochemical Society: Solid-State Science and Technology, Aug. 1973, pp. 1091-1095 by A. S. Tenney, et al.
"Fabrication of $SiO_2$-$TiO_2$ Glass Planar Optical Waveguides by Flame Hydrolysis Deposition", Electronic Letters, vol. 19, No. 15, pp. 583-584, Jul. 21, 1983.
"Silica-Based Planar Waveguides for Passive Components", Optical Fiber Comm. Conference, 1988 Technical Digest Series, vol. 1, Jan. 25-28, 1988, Paper THJ3 by T. Miyashita.
"Integrated Optical Devices Based on Silica Waveguide Technologies", Society of Photo-Optical Instrumentation Engineers, vol. 993, 1988, pp. 288-291, by T. Miyashita.
"Si-Based Integrated Optics Technologies", Solid State Technology, Feb. 1989, pp. 69-74, by S. Valette, et al.

*Primary Examiner*—John D. Lee
*Assistant Examiner*—Phan T. Heartney
*Attorney, Agent, or Firm*—Porter Wright Morris & Arthur

[57] ABSTRACT

An apparatus and method are disclosed whereby channel waveguides are formed to have substantially circular cross-section shapes to more closely match the circular cross-section shape of a typical optical fiber. Rectangular cross-section channel waveguides are heated to create surface tension between the core and cladding layers resulting in the rectangular shape changing to a substantially circular shape. An over cladding layer may be added to the circular cross-section waveguide. A method is also disclosed whereby monolithic lenses may be formed from the same circular cross-section waveguides on a common substrate, simultaneously, to provide substantially perfectly aligned lenses and waveguides that are not prone to alignment and bonding problems of discrete lenses.

13 Claims, 2 Drawing Sheets

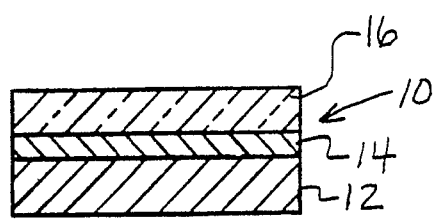
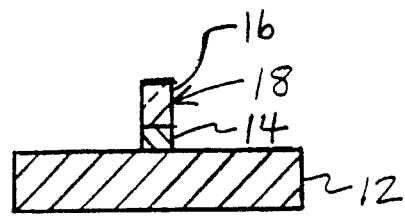
FIG. 1A  FIG. 1B
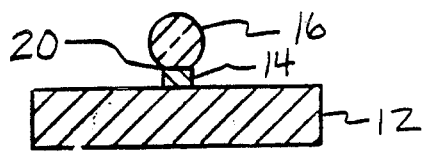
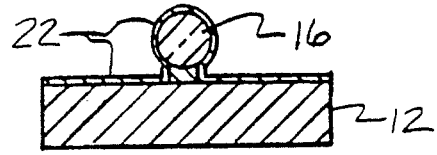
FIG. 1C  FIG. 1D
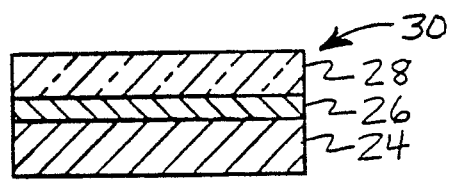
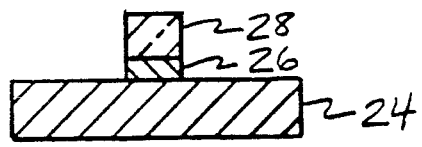
FIG. 2A  FIG. 2B
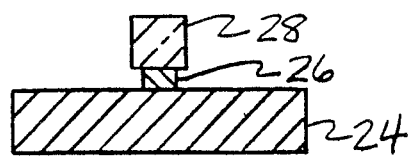
FIG. 2C  FIG. 2D
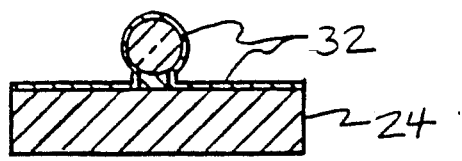
FIG. 2E

CIRCULAR CHANNEL WAVEGUIDES AND LENSES FORMED FROM RECTANGULAR CHANNEL WAVEGUIDES

BACKGROUND AND SUMMARY OF THE INVENTION

This invention relates to optical waveguides, and more particularly to an apparatus and method for forming circular cross-section channel waveguides and monolithic integrated lenses.

An optical fiber typically has a circular cross-section shape. Optical fibers are sometimes coupled by channel waveguides. An end of an optical fiber maY be bonded or otherwise secured to an end of a channel waveguide. Typically, at the other end of the channel, another optical fiber end is secured to receive the optical signal as it travels through the channel. The geometric cross-section shape of a channel waveguide has been square or rectangular. With a light signal traveling from a circular cross-section fiber into a rectangular cross-section channel, there will be a degree of signal loss due to the geometric mismatch.

Channel waveguides have previously been made by deposition on a silicon substrate followed by an etching process. Lenses used to assist coupling between optical elements have usually been hybrid bonded to the substrate. Aligning and bonding discrete lenses is difficult and time-consuming. With the present invention, monolithic lenses are formed on the same substrate with aligned channel waveguides. The formation of circular cross section channel waveguides and spherical lenses on the same substrate are accomplished simultaneously which eliminates previously known aligning and bonding difficulties.

The present invention offers advantages over previously known devices and methods With the present invention substantially circular cross-section channel waveguides are formed. Having the channel waveguides in closer geometric agreement with the optical fibers will result in much lower coupling losses. The method of the present invention may also be used to form monolithic integrated lenses to be used with the channel waveguides to improve coupling efficiency between fibers, waveguides, laser diodes, detectors, and other circuit devices.

Two different methods are revealed by the present invention to make circular cross-section channel waveguides. Both methods are founded on the principle that the surface tension in the channel waveguide will change the shape of the waveguide cross-section from rectangular to circular as the waveguide is heated above its softening temperature. In the first method, square cross-section channel waveguides are formed by planar deposition and etching. Then a selective etchant etches the cladding material to reshape the waveguide. Heat is then applied in a predetermined fashion depending upon the glass composition of the waveguide. A circular shape is obtained due to the surface tension resulting in the glass.

In the second method, a planar waveguide is etched into a vertically rectangular cross-section channel having a cross-section area equal to the final desired circular cross-section area. Heat is applied to allow surface tension in the channel to function As the heat is applied, the core layer and cladding layer will respond differently, resulting in surface tension forcing the core to form a circular cross-section. With either the first or second method, a thin layer of material may be deposited over the core to form an over-cladding layer after the circular cross-section is obtained.

The following references are cited to show the state of the art: M. Kawachi, M. Yasu, and T. Edahiro, "Fabrication of $SiO_2$-$TiO_2$ Glass Planar Optical Waveguides by Flame Hydrolysis Deposition", Electron Lett. Vol. 19, pp. 583, 584 (1983); T. Miyashita, M. Kawachi, and M. Kobayashi, "Silicon Based Planar Waveguides for Passive Components", *Technical Digest, Optical Fiber Communication Conference* (1988), Paper THJ 3; T. Miyashita, S. Sumida, S. Sakaguchi, "Integrated Optical Devices Based on Silica Waveguide Technologies", SPIE Vol. 993 Integrated Optical Circuit Engineering VI, pp. 288-291 (1988); S. Valette, et al., "Si-Based Integrated Optics Technologies", Solid State Technology, pp. 69-75, (Feb. 1989); Y. Yamada, M. Kawachi, M. Yasu, and M. Kobayashi, "High-Silica Multi-Mode Channel Waveguide Structure for Minimizing Fiber Waveguide Fiber Coupling Loss", J. Lightwave Technol. Vol. Lt-4, 277 (1986); M. Kawachi, T. Edahiro and H. Toba, "Microlens Formation on VAD Single-Mode Fiber Ends", Electron Lett. Vol. 18, 71 (1982); J. F. Oliver, C. Huh, and S. G. Mason, "Resistance to Spreading of Liquids by Sharp Edges", Journal Colloide and Interface Science, Vol. 59, No. 3, p. 568 (1977); D. Alles, "Trends in Laser Packaging" Symposium of 40th Electronic Components and Technology Conference, p. 185 (1990); L. A. Reith, J. W. Mann, N. Andreadakis, G. R. Lalk, and C. E. Zah, "Single-Mode Fiber Packaging for Semi-Conductor Optical Devices" Symposium of 40th Electronic Components and Technology Conference, p. 193 (1990); R. Colclaser, "Micro-electronics: Processing and Device Design", published by John Wiley & Sons, Inc., pp. 44, 45 (1980); A. S. Tenney, M. Ghezzo, "Etch Rates of Doped Oxides in Solutions of Buffered HF", Electrochem SOC: Solid State Science and Technology, Vol. 120, No. 8, p. 1091 (1973).

The foregoing and other objects and advantages will become more apparent when viewed in light of the accompanying drawings and the following description:

BRIEF DESCRIPTION OF THE DRAWINGS

FIG. 1A is an elevational view of a planar waveguide;

FIG. 1B is an elevational view of a vertically rectangular channel waveguide formed from the planar waveguide in FIG. 1A;

FIG. 1C is an elevational view of a circular channel waveguide formed by heating the channel waveguide of FIG. 1B;

FIG. 1D is an elevational view of the channel waveguide of FIG. 1C with an over-cladding layer;

FIG. 2A is an elevational view of a planar waveguide;

FIG. 2B is an elevational view of a channel waveguide formed from the planar waveguide of FIG. 2A;

FIG. 2C is an elevational view of a channel waveguide formed from the channel waveguide of FIG. 2B by etching;

FIG. 2D is an elevational view of the channel waveguide of FIG. 2C formed into a circular channel by heating;

FIG. 2E is an elevational view of the channel waveguide of FIG. 2D with an over-cladding layer;

DESCRIPTION OF THE PREFERRED EMBODIMENT(S)

Figure 3A:
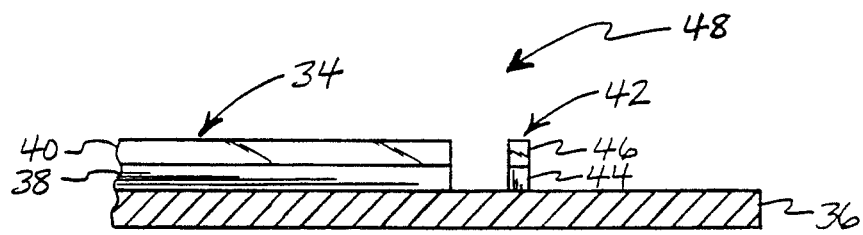
FIG. 3A is a side elevational view of a rectangular channel waveguide and rectangular lens on the same substrate.

The present invention is useful in making low loss integrated optical devices and opto-electronic devices. Referring now to the drawings, there is illustrated in FIG. 1A a planar waveguide device 10 comprised of a substrate 12 over which is deposited a glass-cladding layer 14. A glass core layer 16 is then deposited over the cladding layer 14 which may be accomplished by flame hydrolysis deposition (FHD). Other methods such as CVD, sputtering or laminating may be used to form the planar waveguide. The planar waveguide 10 is first etched or patterned into a vertically rectangular cross-section channel 18 as shown in FIG. 1B. The rectangular cross-section area will equal the final circular cross-section area. After the vertically rectangular channel 18 is formed, it is heated over the softening or melting temperature of the core layer 16 material which results in a change in the surface tension of the core layer 16. In a solid state there is little or no surface tension. As the solid core layer 16 is heated, surface tension functions to reshape the core layer 16.

The softening or melting temperature of the core layer 16 is usually lower than that of the cladding layer 14 material because the core layer 16 is doped with foreign materials to raise its refractive index. When the circuits are heated to a temperature between the softening/melting temperatures of the core 16 and cladding 14 materials, the core 16 will be softened or melted while the cladding layer 14 stays rigid. Due to the surface tension of the core-cladding boundary 20, the softened or melted core 16 will not flow down the rigid cladding base 14. This results in surface tension changing the core layer 16 to a circular cross-section as shown in FIG. 1C.

After the circular cross-section channel waveguides are formed, a layer of low index material may be deposited over the core 16 to form an over-cladding 22 as shown in FIG. 1D. The final result is a substantially circular cross-section waveguide very similar in cross-section shape to an optical fiber. This results in input and output coupling loss being much lower between the fibers and integrated circuits.

A second method of forming the circular cross-section waveguides will now be described. Referring to FIG. 2A, this method also begins with a substrate 24 (of silicon, silica, ceramics, or other suitable material) having cladding 26 and core 28 layers deposited or laminated thereon to form a planar waveguide 30. First, etching or patterning is used to form the core 28 and cladding 26 layers into the rectangular shape shown in FIG. 2B. Then, a selective etchant, buffered HF, may be used to etch the cladding material 26 more than the core material 28 and results in reshaping the waveguide 30 as shown in FIG. 2C.

The circuits are then heated above the softening or melting temperature resulting in the surface tension naturally rounding the waveguide cross-section as shown in FIG. 2D. Lastly, an over-cladding, protective layer 32 may be deposited over the core 28 as shown in FIG. 2E.

In this second method, the cladding layer 26 again has a lower refractive index than the core layer 28. The core layer 28 refractive index was increased by adding a dopant such as $GeO_2$. During buffered HF, the doped $SiO_2$ of the core layer 28 is etched much slower than the cladding layer 26. Both the time of heating and the temperature achieved are critical to the success of the present invention. The time necessary to heat and the maximum temperature of heating depend on the type of dopant used and the quantity of dopant.

The following two examples are provided to better explain the present invention but in no way should these examples be interpreted to limit the scope of the invention to the materials, quantities, and other specifics noted in the examples.

In each example, a multi-mode waveguide was used but it could be a single mode waveguide as well.

EXAMPLE 1

Planar waveguides with 90 micron thick core and 30 micron thick cladding were patterned into 105 micron wide channel waveguides. Channel waveguides with core glass composition of 74.9% $SiO_2$, 21.0% $GeO_2$, 3.6% $B_2O_3$ and 0.5% $P_2O_5$ and cladding glass composition of 97.6% $SiO_2$, 2.0% $B_2O_3$ and 0.4% $P_2O_5$ were selectively etched in buffered HF (6 parts 40% $NH_4F$ solution to one part 48% HF solution by volume) for 150 minutes to form a structure as shown in FIG. 2C and were then heat treated at 1160° C. for two hours to form the substantially circular cross-section waveguides with 100 micron diameter.

EXAMPLE 2

Planar waveguides with 90 micron thick core and 30 micron thick cladding were patterned into 108 micron wide channel waveguides. Channel waveguides with core glass composition of 78.8% $SiO_2$, 21.0% $GeO_2$, and 0.2% $P_2O_5$ and cladding glass composition of 97.6% $SiO_2$, 2.0% $B_2O_3$ and 0.4% $P_2O_5$ were etched in buffered HF for 320 minutes to form a structure as shown in FIG. 2C. These waveguides were then heat treated at 1300° C. for two hours to form the nearly circular cross-section waveguides.

In addition to $GeO_2$, dopants such as boron oxide ($B_2O_3$) and titanium dioxide ($TiO_2$) also reduce the $SiO_2$ etch rate in buffered HF. Phosphorous oxide ($P_2O_5$) has the opposite effect to increase the $SiO_2$ etch rate. $GeO_2$ and $TiO_2$ are used to raise the refractive end of silica while $P_2O_5$ and $B_2O_3$ are used to lower the softening temperature of silica. Therefore, doped silica is etched at different rates in buffered HF, depending upon the dopants. By properly choosing the dopants of the core and cladding layers of the channel waveguide, one can have the buffered HF selectively etch more cladding layer than the core layer.

Experiments were conducted to determine the benefits to coupling loss and propagation loss for the waveguides of the present invention. A cut-back measurement was taken to get this data. 100um optical fibers were used for input and output fibers. A mode mixer and long-length fiber (500m) were connected to the input fiber to make sure that the full mode excitation and steady state were achieved before the light was coupled to the waveguides. The loss was measured at different lengths and the loss data was fitted into a straight line by a least square method.

The propagation loss was measured to be 0.12dB/cm and the coupling loss was measured to be 0.47dB, which is much lower than 1.7dB, the minimized coupling loss between square cross-section step index waveguides and optical fibers. The tested round waveguides were step index waveguides but the application of this invention is not limited to step index waveguides but can also be applied to graded index waveguides. Furthermore, the propagation loss of 0.12dB/cm is much better than that of the square cross-section waveguides whose propagation loss is normally 0.3dB/cm or higher. By heating the waveguides to form round waveguides, the sidewall roughness was eliminated as the glass softened. Normally sidewall roughness is one cause of light scattering which increases loss.

Figure 3B:
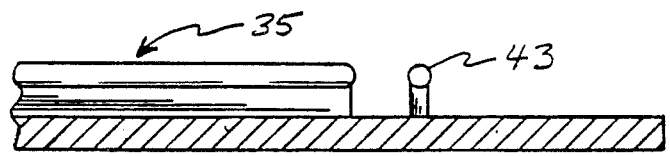
FIG. 3B is a side elevational view of a circular channel waveguide and a circular lens formed from the waveguide and lens of FIG. 3A.

A further feature of the present invention, using the methods described above, is the formation of monolithic lenses and channel waveguides simultaneously on a common substrate. As shown in FIG. 3A, a long rectangular waveguide 34 is formed from a planar waveguide on a substrate 36; the waveguide 34 having a cladding layer 38 and core layer 40. Additionally, a short block waveguide 42 is formed on the substrate 36 also having a cladding layer 44 and core layer 46. The entire assembly 48 may be selectively etched and placed in a furnace and heated until the softening or melting temperature is reached. The long waveguide 34 will form a circular cross-section channel waveguide 35 as shown in FIG. 3B and at the same time the short block waveguide 42 will form a spherical lens 43.

Previous discrete lenses used in combination with channel waveguides had to be aligned and bonded to a substrate independently of the channel waveguide. However, as shown in FIG. 3B, the present invention has the channel waveguide and lens formed directly on the substrate 36. Therefore, bonding is readily accomplished. Alignment of the channel waveguide 35 and the lens 43 can be accomplished automatically through the heating process if the starting dimensions for both the waveguide 34 and short block 42 are pre-selected.

Figure 4A:
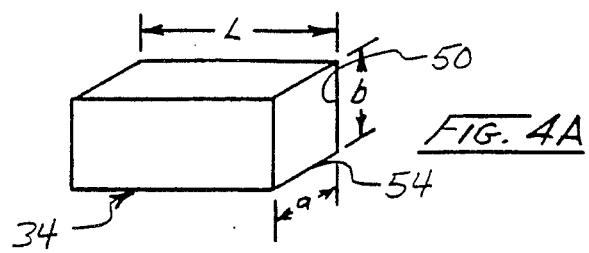
FIGS. 4A and 4B are perspective views of the rectangular channel waveguide and rectangular lens respectively of FIG. 3A showing the relationship between various dimensions.
Figure 4B:
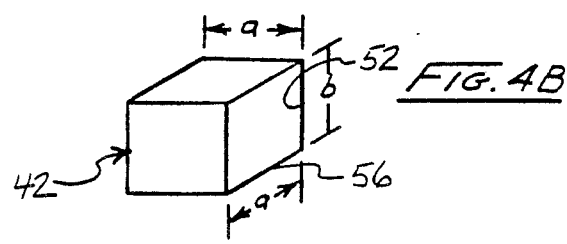

The long rectangular waveguide 34 from FIG. 3A is shown apart from the substrate 36 in FIG. 4A. The short block waveguide 42 of FIG. 3A is shown apart from the substrate 36 in FIG. 4B. If the depths (b) 50,52 and the widths (a) 54,56 of the long waveguide 34 and short block 42 are equivalent and the relationship between (b) and (a) is described by the equation (b) $\sim 1.8(a)$, then theoretical calculation shows that substantially perfect alignment will be accomplished upon heating.

Figure 5:
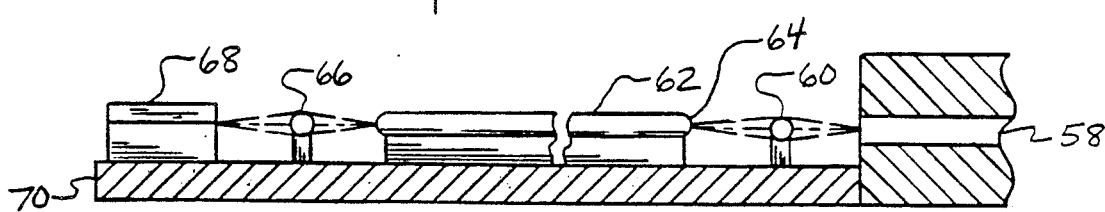
FIG. 5 is an elevational view of a lens assisted coupling between a laser diode, channel waveguide and optical fiber.

The devises and methods of the present invention may be used to form low loss integrated optical assemblies such as shown in FIG. 5. Light from a laser diode 68 may pass through a circular lens 66 and focused into a circular cross-section channel waveguide 62. At an opposite end 64 of the channel waveguide 62, the light may exit through a second lens 60 and pass into an optical fiber 58. Since this is accomplished on a common substrate 70, much of the trouble of aligning and bonding lenses is eliminated.

While it will be apparent that the preferred embodiments of the invention disclosed herein are well calculated to provide the advantages and features above stated, it will be appreciated that the invention is susceptible to modification, variation and change without departing from the proper scope or fair meaning of the subjoined claims.

What is claimed is:

1. A method for forming circular cross-section channel waveguides, said method comprising the steps of:
   forming a planar waveguide on a substrate, said waveguide having a core layer and a cladding layer;
   forming said core and cladding layers into a rectangular cross-section channel waveguide;
   selectively etching said cladding layer more than said core layer; and
   heating said waveguide above a softening temperature resulting in surface tension in said core layer functioning to shape said core layer into a substantially circular cross-section shape.

2. The method of claim 1, wherein said selective etching is accomplished using buffered HF.

3. The method of claim 1, wherein said cladding layer is selectively etched more than the said core layer because said core layer is previously doped to raise its refractive index.

4. The method of claim 3, wherein said doped core layer is doped with a member of the group of dopants comprising $GeO_2$, $B2O3$, $TiO_2$ and $P2O5$.

5. The method of claim 1, wherein said forming of said layers into a rectangular channel waveguide is accomplished by etching.

6. The method of claim 1, wherein said forming of said layers into a rectangular channel waveguide is accomplished by patterning.

7. The method of claim 1, further comprising:
   applying an over-cladding layer to said circular cross-section channel waveguide.

8. A method for forming a circular cross-section channel waveguide, said method comprising the steps of:
   forming a planar waveguide on a substrate, said waveguide including a core layer and cladding layer, said core layer doped to raise its refractive index;
   etching said planar waveguide to remove a substantial portion of said core layer and said cladding layer to generally result in a rectangular cross-section area equal to the desired final circular cross-section area; and
   heating said channel waveguide to at least a softening temperature of said core layer resulting in surface tension in said core layer creating a substantially circular cross-section shape while said cladding layer remains substantially rigid.

9. The method of claim 8, further comprising: applying an over-cladding layer to said circular cross-section core layer.

10. The method of claim 8, wherein said doped core layer is doped with a member of the group of dopants comprising $GeO_2$, $B2O3$, $TiO_2$ and $P2O5$.

11. A method for forming a self-aligned circular cross-section lens and circular cross-section channel waveguide assembly, said method comprising the steps of:
   providing a substrate;
   forming a rectangular waveguide having a core layer and cladding layer onto said substrate;

forming a short block waveguide having a core layer and cladding layer onto said substrate at a predetermined distance from said long waveguide to form said assembly;

placing said assembly into a heating device; and simultaneously heating said waveguides above their softening temperature for a time until said core layers form substantially circular cross section shapes.

12. The method of claim 11, futher comprising:

selecting the depths and widths of said channel waveguide and said short block to be substantially equal and further selecting said depth to be generally equal to 1.8 times said width.

13. An optical circuit assembly, comprising:

a substrate suitable for forming a waveguide thereon;

a substantially circular cross-section channel waveguide formed on said substrate, said circular channel waveguide formed from a planar waveguide comprising a doped core layer on a cladding layer; and a lens formed from a short block waveguide on said substrate and in alignment with said planar waveguide, said lens and said circular cross-section channel waveguide formed simultaneously by application of heat to said assembly to soften said short block waveguide and said planar waveguide thereby forming said substantially spherical lens and said substantially circular cross-section waveguide.

* * * * *